United States Patent [19]

Foster et al.

[11] 3,726,922

[45] Apr. 10, 1973

[54] PROCESS FOR THE MANUFACTURE OF N,N-BIS(2-CHLOROETHYL)-2-NITRO-4-ALKYL-ANILINE

[75] Inventors: Harold M. Foster, Park Forest; Thomas C. Rees, Park Forest South; Floyd G. Spence, Park Forest, all of , Ill.

[73] Assignee: The Sherwin-Williams Company, Cleveland, Ohio

[22] Filed: Mar. 16, 1970

[21] Appl. No.: 20,107

[52] U.S. Cl. .................. 260/577, 260/571, 260/573, 260/574, 260/575, 260/576, 260/578, 260/688, 424/330
[51] Int. Cl. ............................................. C07c 87/60
[58] Field of Search ................... 260/571, 573, 574, 260/575, 576, 577, 578, 688

[56] References Cited

UNITED STATES PATENTS

| | | | |
|---|---|---|---|
| 3,119,736 | 1/1964 | Clark et al. | 260/577 X |
| 3,442,639 | 5/1969 | Soper | 260/577 X |

OTHER PUBLICATIONS

Sidgwick's Organic Chemistry of Nitrogen, 3rd Ed., Clarendon Press: Oxford, 1966, Page 385.
Merck Index, 7th Ed., Merck & Co., Inc., Rahway, N.J., 1960, Page 995.
Chemical Abstracts, Kristian et al., 1959, Vol. 53, 21735g.

*Primary Examiner*—Lewis Gotts
*Assistant Examiner*—C. F. Warren
*Attorney*—McNenny, Farrington, Pearne & Gordon

[57] ABSTRACT

A novel compound N,N-bis(2-chloroethyl)-2-nitro-p-toluidine, and a direct process for its preparation by the orthomononitration of N,N-di-(2-haloalkyl), 4-substituted anilines with only concentrated nitric acid with suppression of formation of nitrous acid, or nitrite ions in aqueous acid medium, without the formation of 2,6-dinitro-4-substituted product. Specifically, a process for the manufacture of N,N-bis(2-chloroethyl)-2-nitro-p-toluidine starting with p-toluidine as raw material.

The instant mononitro compounds, and particularly N,N-bis(2-chloroethyl)-2-nitro-p-toluidine, are repellents for Mexican bean beetles and beetle larvae.

2 Claims, No Drawings

PROCESS FOR THE MANUFACTURE OF N,N-BIS(2-CHLOROETHYL)-2-NITRO-4-ALKYL-ANILINE

BACKGROUND OF THE INVENTION

The economics of the manufacture of a bulk chemical, no matter how sophisticated or complicated it might be, determines the degree of success the manufacturer will meet in the marketplace. Stated differently, one might say manufacturing economics require that even a complicated chemical be manufactured from a relatively cheap raw material, using a minimum number of relatively inexpensive steps, forming a minimum quantity of undesirable by-products and wasting as little as possible. Particularly where the manufacture of the desired end product necessitates a number of steps, with a wide selection of materials predicating varying degrees of efficacy which may be further modified by a judicious choice of process conditions, the particular selection of a sequence of steps may be far from obvious. Theoretical appraisals of possible reactions are of little avail. Duplication of experiments outlined in references, and bench scale experimentation with reactions, both familiar and unfamiliar, are necessary concomitants of a careful evaluation of experimental data essential to the choice of a successful manufacturing process. Faced with outlining a profitable commercial synthesis, one skilled in the art is most unlikely perfunctorily to choose classical reactions solely on the basis of their textbook efficacy. Instead, each step is carefully analyzed, evaluated several times in experimental runs, and again reevaluated for full scale production. In the instant process, it is apparent that choice of a raw material poses several alternatives.

For example, ortho-mononitrated parachlorotoluene may be reacted with diethanolamine to form the N-dihydroxy ethyl orthomononitrated p-toluidine which may subsequently be halogenated with by-product HCl formation which may be represented by the reactions as follow:

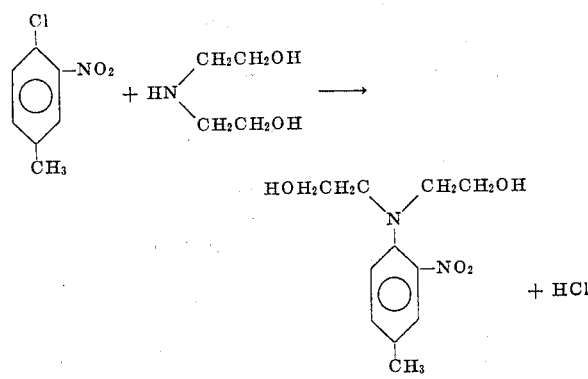

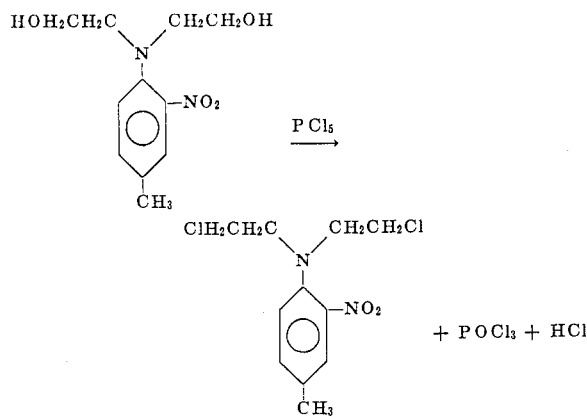

Still another route is to form ortho-mononitrated p-toluidine which may then be hydroxyethylated and subsequently chlorinated to form the dichloroethyl-substituted compound, as follows:

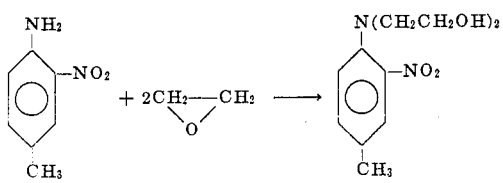

then chlorinate as before.

Yet another route is to start with p-toluidine, which must then be mononitrated in the ortho position, then hydroxy-alkylated and halogenated. There are at least three distinct steps and two intermediate products.

All three schemes involve a plurality of steps not notably efficient by themselves, and more discouraging, only marginally operable if operable at all. It became necessary to devise a sequence of steps within the overall scheme outlined in the third method so that high efficiency, selectivity and yields could be achieved. The instant invention does so.

Upon examination, it will be apparent that there are several sequences of operation embodied in the third process. There are at least three different routes which one skilled in the art might pick. One might list at least three superficially feasible sequences of operation thus:

| (1) | (2) | (3) |
|---|---|---|
| Mononitration | | Hydroxyalkylation |
| Hydroxyalkylation | Mononitration | Halogenation |
| Halogenation | Halogenation | Mononitration |

The sequences of these reactions may be set forth more graphically as follows:

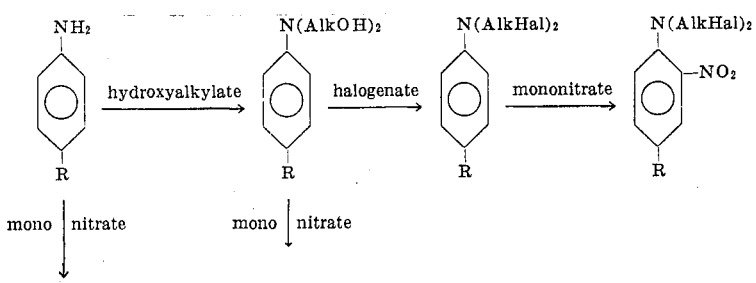

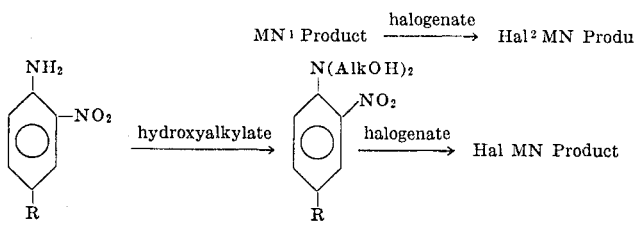

[1] MN = mononitrated.  [2] Hal = halogenated.

Curiously enough, only the series in the last column, represented in the reactions at the top of the page and across it, is operable. Unexpectedly, various combinations become inoperable for one reason or the other. It is impossible to foretell which ones would be operable and which ones would not be operable. For example, though p-toluidine may be successfully mononitrated, it cannot then be hydroxyalkylated. Though p-toluidine can be hydroxyalkylated, it cannot then be mononitrated successfully. It is unnecessary to state that, having arrived at an inoperable reaction or one that is inoperable for all practical purposes, since the amount, quality or separability of the product is such that it is of no economic value, any further steps in the process have little meaning. Other combinations of the steps to be added to the list outlined above are mathematically possible, but a skilled chemist would discard them out of hand, and therefore such combinations are not seriously considered and have not been listed.

Although, admittedly, the steps of hydroxyalkylation and halogenation are old, the combination of these old steps in conjunction with the particular nitration step disclosed by the applicants is novel, competitively useful, and quite unobvious. Particular attention is focused on the nitration reaction, which enables the di-(2-haloalkylated) material to be mononitrated without the formation of polynitro by-products, at the same time permitting the process to be carried out with high selectivity and very high yields.

Practically all known nitrating agents such as concentrated nitric acid, mixed acids, for example nitric acid admixed with a dehydrating acid such as oleum, sulfuric acid, acetic anhydride, acetic acid, phosphorus pentoxide, alkylene nitrates in the presence of sulfuric acid, organic nitrates such as acetyl and benzyl nitrates, metal nitrates with acetic acid, nitrosulfonic acid, nitrogen tetroxide and the like, have been used in the preparation of nitro-aromatic compounds. Economic considerations are generally determinants in the choice of the agent. Often, however, certain inherent chemical or physical properties, or the presence of substituents, necessitate the use of specific nitrating agents. The choice of the nitrating agent and the conditions of reaction may furthermore determine the position of the entering nitro group. As a rule, the orientation of entering nitro groups in aromatic compounds is determined by the position of groups already present. Generally, the nitro group enters a position meta to a nitro, sulfonic acid, carboxyl, or carbonyl group; and ortho and para to a chloro, bromo, alkyl, amino, or hydroxyl group. Further, a lower temperature of nitration is conducive to the exclusive formation of the meta derivatives in the first group, and a preponderance of para compound in the second. In case two or more groups are already present, it is difficult to predict which compound will be formed owing to the conflicting influences of these groups, and often a mixture of different compounds will result upon nitration. ("Unit Processes in Organic Synthesis," by P. H. Groggins, Page 8, McGraw Hill Book Co., Inc., New York, 1938.) Since amino compounds are very susceptible to oxidation, it is generally necessary to protect the $NH_2$ group during nitration, usually by converting the amine to its acyl derivative. Sometimes it is possible to nitrate amino compounds without resorting to previous acylation, but the product obtained is likely to differ from that obtained by the nitration of the acyl derivative. For example, when p-toluidine is dissolved in a large quantity of sulfuric acid and nitrated with mixed acid ($HNO_3$—$H_2SO_4$ mixture) at low temperatures, 3-nitro-p-toluidine is obtained. The nitration of the acetyl derivative yields 2-nitro-p-toluidine. (Groggins, Page 10-current numbering.)

Surprisingly, it was found that N,N-di-(2-haloalkyl) amino-p-phenyl substituted compounds which are tertiary aromatic amines can be directly nitrated to form the ortho-mononitrated product without formation of the ortho-dinitrated product in a single step under controlled reaction conditions despite the fact that, in addition to the obstacles set forth hereinabove, the dialkyl substitutions offer strong steric hindrance to the mononitration of the phenyl ring in a position ortho to the nitrogen atom.

The ortho-mononitrated tertiary aromatic amines of the instant invention are highly effective miticides, insecticides, nematocides, and fungicides. In particular, N,N-bis(2-chloroethyl)-2-mononitro-p-toluidine is a highly effective repellent of Mexican bean beetle larvae, as well as being a valuable intermediate for the preparation of the ortho-dinitrated compound, namely, N,N-bis(2-chloroethyl)-2,6-dinitro-p-toluidine, an extremely effective and highly selective herbicide, the process for which is the subject matter of co-pending application Ser. No. 20,124 filed March 16, 1970. The instant orthomononitrated compound may be used as a beetle repellent in liquid solutions or incorporated with finely divided solids, such as talc, pumice, clay and the like. If desired, it may be compounded with either solid or liquid fertilizer mixtures. When used as a miticide, or as a beetle repellent, preferred concentrations are in the range from about 0.05 to about .5 per cent by weight of solution.

The instant process contemplates a reaction which may be generally represented as follows:

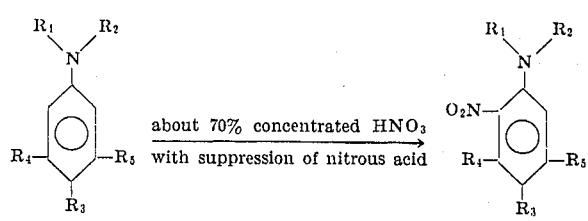

wherein $R_1$ and $R_2$ are independently selected from 2-haloalkyl having from 2 to 4 carbon atoms; $R_3$ is selected from alkyl having from one to four carbon atoms, aryl, aralkyl, alkoxy, halogen, and haloalkylene having from one to four carbon atoms; and $R_4$ and $R_5$ are independently selected from the group consisting of hydrogen, alkyl having from one to four carbon atoms, haloalkylene have from one to four carbon atoms, and halogen.

More particularly, it has been discovered that N,N-di-(2-haloalkyl)-p-toluidine can be effectively mononitrated directly in an acetic acid medium using concentrated aqueous nitric acid present at the beginning of the reaction in the range from about 30 to 80 percent and in which the formation of nitrous acid is suppressed by the presence of a nitrous acid suppressor such as sulfamic acid. Although the mechanism of the reaction is not precisely known, this particular reaction is thought to proceed as follows:

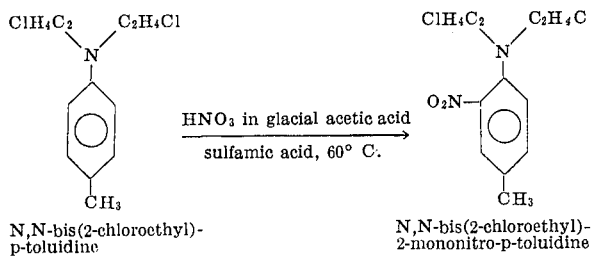

N,N-bis(2-chloroethyl)-p-toluidine → N,N-bis(2-chloroethyl)-2-mononitro-p-toluidine It is a peculiarity of the instant reaction that at temperatures lower than 25° C., no mononitration occurs, but as the temperature is increased, and particularly when the temperature is about 60° C., the mononitro compound begins to form slowly at first and then continues to form more rapidly. Moreover, the formation of the mononitro compound continues until all the N,N-dihaloalkyl-p-toluidine is ortho-mononitrated, whereupon the mononitro product rapidly disappears, giving rise to the formation predominantly of N-nitroso-2-chloroethyl-2,6-dinitro-p-toluidine, a compound which is not desirable. Since the formation of the ortho2dinitro-substituted-nitroso compound is to be avoided, it is imperative that the mononitration reaction be quenched prior to the complete consumption of the N,N-dihalo-alkyl p-toluidine.

Of particular interest is the fact that the N,N-bis(2-hydroxy ethyl)-p-toluidine cannot be directly mononitrated under similar reaction conditions. It is necessary that the dihydroxy alkyl-substituted paratoluidine be first halogenated prior to ortho-mononitration.

It is known that nitrous acid nitrates dimethyl-p-toluidine giving at least 80 percent of 2-nitro-dimethyl-p-toluidine (2-nitro-1-dimethyl amino-4-methyl benzene) though nitric acid at the same dilution is practically inactive. ("Nitrous Acid as a Nitrating Agent, Part I, Nitration of Dimethyl-p-Toluidine," J. Chem. Soc., 1930, Pages 277 – 291.) However, it will be noted that in the instant invention no nitrous acid is used, and that in fact a suppressor is included in a nitrating acid consisting essentially of about 70 percent concentration aqueous nitric acid, yet the ortho-mononitration does occur. The same reference proceeds to state that the mononitro product in which the nitro group enters the nucleus of the molecule normally produced by the nitration process is the 3-nitro-dimethyl-p-toluidine. It will be noted that in the instant invention the ortho-nitro product is formed. In other words, assuming that the dihaloalkyl side chains of the instant starting material would be no more susceptible to attack, nor have a substantially different effect on the course of the reaction than the dimethyl groups, then "ordinary" nitration would be expected to yield the meta-mononitro-substituted product, rather than the ortho-mononitro-substituted p-toluidine. Viewed conventionally, the instant process embodies an "ordinary" nitration except for the fact that essentially only nitric acid is used and that nitrous acid is deliberately suppressed during the course of the reaction.

The reaction embodied in the instant invention is again unexpected in light of the authoritative discussion and study of the kinetics and the mechanism of aromatic nitration set forth in Part VII "Products of Nitration of Aniline Derivatives, Especially of Dimethyl Aniline. The Concomitant Dealkylation of the Dialkylanilines" by Glazer, Hughes et al. in J. Chem. Soc. (1950), Pages 2657–2678, wherein the authors discuss in detail various derivatives obtained upon nitration and the probable mechanisms by which they occur. When dimethyl aniline was nitrated, it gave the metanitro derivative, presumably through its conjugate acid with nitronium ion as the reagent. Immediately thereafter, it is stated, "These nitration stages are highly dependent on nitrous acid when the availability of the nitronium ion is low, but are notably less so when it is high." However, it will be noted that the nitration was carried in the presence of concentrated sulfuric acid. No concentrated sulfuric acid is present in the instant reaction. Immediately thereafter, the nitration of dimethyl aniline by nitric acid in various concentrations in ether is discussed. It was found that part of the material became oxidized to give tetramethylbenzidine and other products, along with nitrous acid. The first simple substitution product was nitroso-dimethyl-aniline, which was formed after an induction period. With a more concentrated nitration solution, or at a higher temperature, this substance became oxidized to p-nitro-dimethyl aniline, and then into substances involving demethylation. Also listed is the nitration of dimethyl aniline by nitric acid in acetic acid as solvent which gave the p-nitro dimethyl aniline as the main product. When a more concentrated nitration solution was used in acetic acid, the main product was found to be 2,4-dinitro-dimethyl-aniline. When dimethyl aniline was treated in 10 percent solution in acetic acid for 24 hours at room temperature with varying quantities of 70 percent nitric acid containing nitrous acid, the proportion of nitric acid ranging from 1 to 1/5 mols per mol of dimethyl aniline, near the lower end of the range, much dimethyl aniline remains unconverted under the conditions used; but by careful chromatography small amounts of p-nitroso dimethyl aniline and the dinitrotetramethyl benzidine were isolated. In the following paragraph the authors state, "It is usually rather easy to separate the stages of successive nitration of a benzene derivative; but it seems very difficult to effect a clean separation of the mononitration from the dinitration of dimethyl aniline. As the proportion of nitric acid was gradually increased in these experiments, unconverted dimethyl aniline and green nitroso compounds disappeared in succession from the products; and, simultaneously, mononitrodimethyl anilines and 2,4-dinitro dimethyl aniline successively appeared in the products. With 1.4 mols of nitric acid per mol of dimethyl aniline, no unconverted dimethyl aniline remained, and only small amounts of nitroso compounds were present, whilst the formation of 2,4-dinitro dimethyl aniline did not assume large proportions. These were judged to be the best conditions for mononitration." From a study of what was judged to be the best conditions for mononitration, it will be apparent that they were unable to arrive at results approximating those in the instant invention for a number of reasons, the main one being that the 70 percent nitric acid used by the authors contained nitrous acid.

SUMMARY OF THE INVENTION

A new composition of matter is discovered which may be generally regarded as a mononitrated N,N-bis(2-haloalkyl)-4-substituted tertiary aromatic amine. More specifically, a new compound N,N-bis-(2-chloroethyl)-ortho-mononitro-p-toluidine is discovered which has miticidal, fungicidal, and insecticidal properties.

It has also been discovered that a 4-substituted tertiary aromatic amine must necessarily be first hydroxylated, then halogenated prior to nitration, and that this sequence of process steps is a critical factor in the success of the overall synthesis from starting raw material to the desired orthomononitrated N,N-bis(2-haloalkyl)-4-substituted tertiary aromatic amine.

It has been further discovered that a dihaloalkyl-substituted tertiary aromatic amine may be directly ortho-mononitrated with an excess of concentrated nitric acid in the range from about 30 to about 80 percent at the beginning of the reaction, in the absence of nitrous acid, or a derivative of nitrous acid capable of generating nitrite ions. The nitration may also be carried out with concentrated nitric acid in the range specified hereinabove, admixed with glacial acetic acid. The dihaloalkyl-substituted tertiary aromatic amine may be converted to the ortho-mononitrated compound without concomitant dealkylation, essentially without the formation of the ortho-dinitrated compound or other polynitrated compounds, at relatively low temperatures, with selectivities in excess of 90 percent and high yields. Water formed during the reaction is not immediately removed, and appears not to influence the rate or selectivity of the reaction adversely, but the concentration and quantity of the nitric acid used at the start of the reaction is selected so that the concentration of aqueous acid at the completion of the reaction is not less than 30 percent.

PREFERRED EMBODIMENT OF THE INVENTION

A preferred embodiment of the N,N-bis(2-haloalkyl)-2-nitro-4-substituted tertiary aromatic amine is the compound N,N-bis(2-chloroethyl)-2-nitro-p-toluidine.

In a specific and preferred embodiment of the instant process in which raw material p-toluidine is converted to N,N-bis-(2-haloalkyl)-2-nitro-p-toluidine, the first step of hydroxyalkyl-ation is carried out in the presence of about 4 normal acetic acid using liquid ethylene oxide or propylene oxide. The temperature is maintained in the range from about −10° to 30° C. and the exotherm is carefully monitored while continuous agitation permits the reaction to proceed to completion. The hydroxyalkylated product is recovered by extraction with a suitable solvent such as chloroform. The next step of halogenation is effected by reacting the hydroxyalkylated product in the solvent with a halogenating agent such as a chlorinating agent selected from a phosphorus pentachloride, phosphorus oxychloride, or thionyl chloride to form the dichloroalkyl-substituted p-toluidine. The reaction is started at about ambient temperature, then slowly heated to reflux before the reaction is adjudged complete. The halogenated product may be recovered from the solvent by any conventional means, such sa distillation. Ortho-mononitration of the N,N-bis(2-haloalkyl)-p-toluidine is preferably carried out in a jacketed pressure vessel equipped with internal heat exchange means and variable adjustable mixing means, using concentrated nitric acid only in the presence of a nitrous acid suppressor. Although the reaction may also be carried out continuously, batch-wise reaction in an autoclave gives exceedingly good results with a high degree of control and reproducibility.

At least a 50 percent excess over the theoretically required amount of nitric acid, and preferably about a twofold excess of about 70 percent aqueous nitric acid, is used. Lower concentrations of acid will require proportionately larger excesses, but at least enough acid must be used to ensure that the concentration near completion of the reaction is at least 30 percent acid. A small quantity of solid sulfamic acid, is added to destroy any nitrous acid which might be present, and to suppress the formation of any additional nitrous acid, or derivative thereof, capable of generating nitrite ions in aqueous acid medium. The quantity of sulfamic acid used may be in the range from about 0.001 to about 5 percent by weight of the aqueous acid phase at the inception of the ortho-mononitration reaction. To the acid mixture is added N,N-bis(2-chloro-ethyl)-p-toluidine and it is homogeneously dispersed into the acid phase. As long as the temperature of the mixture is maintained at about 25° C., no reaction occurs. From 60°C. to 150°C reaction occurs. The mixture is then warmed to about 60° C, when the mononitro-ortho-substituted compound begins to form slowly at first but increases its rate of formation as more of the N,N-dihaloalkyl tertiary aromatic amine is ortho-mononitrated. It is imperative that the reaction mass be sampled to determine the rate of progress of the reaction, for as sooon as the N,N-dihaloalkyl tertiary aromatic amine is entirely mononitrated, the mononitrated compound in turn rapidly reacts with pernicious speed to form predominantly the nitroso-substituted ortho-dinitro compound and lesser quantities of the ortho-dinitrated compound. However, if the reaction embodied in the instant process is stopped prior to the complete consumption of the N,N-dihaloalkyl tertiary aromatic amine, it is found that the ortho-mononitrated compound can be recovered almost quantitatively.

EXAMPLE I 288 grams of p-toluidine and 150 ml. of 4 N aqueous acetic acid are thoroughly mixed and cooled to about 5° C. 220 g. of liquefied ethylene oxide are added to the mixture with constant stirring, while the temperature is maintained at about 5° C. The temperature is subsequently permitted to rise to ambient temperature, whereupon a further quantity of about 250 ml. of liquefied ethylene oxide is added, again with constant stirring and cooling. After the reaction is complete, the reaction mixture is neutralized with an aqueous sodium carbonate solution and is extracted with chloroform.

The reaction product, identified as N,N-bis(2-hydroxyethyl)-p-toluidine, is obtained in substantially quantitative yields, and is extracted into the chloroform phase. The chloroform layer containing the dihydroxyethyl compound is reacted with a slight excess of phosphorus pentachloride, which is added incrementally while constantly stirring. The temperature is raised to about 50° C. and refluxed until halogenation of the hydroxy groups is complete. The reaction mixture is drowned in ice water to destroy remnants of the chlorinating agent. The layers of chloroform and water are then separated and the chloroform layers washed until neutral. Upon azeotropic distillation of the chloroform layer, N,N-bis(2-chloroethyl)-p-toluidine is obtained in about 80 percent yield.

10 parts N,N-bis(2-chloroethyl)-p-toluidine are stirred into 34 parts glacial acetic acid and 0.5 part sulfamic acid added thereto. The mixture is warmed to about 60° C. and 24.3 parts 70 percent aqueous nitric acid are gradually added to the mixture over a 30-minute interval while stirring constantly. Agitation is continued for about 55 minutes at 60° C. during which time samples are periodically taken and analyzed on a gas chromatograph to follow the progress of the reaction. At the end of 55 minutes, while analysis indicates the presence of some N,N-bis(2-chloroethyl)-p-toluidine in the reaction mixture, the reaction is terminated by drowning in ice cold water. The product is N,N-bis(2-chloroethyl)-2-nitro-p-toluidine which is isolated in 94 percent yield.

Similar reactions can be carried out with a raw material in which the methyl group of p-toluidine is replaced by a phenyl group. Again, similar reactions can be carried out with a raw material in which the p-toluidine is 2-chloro-propylated. In each case, the corresponding ortho-mononitrated product is obtained.

In the production of the mononitro compound described in the example hereinabove, at least 1 mol of nitric acid per mol of haloalkylated 4-substituted tertiary aromatic amine must be used. It is preferred that an excess of concentrated nitric acid be employed, which may range as high as a tenfold excess. In general, about a twofold excess will suffice; the upper limit of the excess used will be predicated upon economic considerations and the requirement that the concentration of aqueous acid near the completion of the reaction should be at least 30 percent. It is desirable that the quantity of sulfamic acid, be limited to that quantity necessary to suppress formation of nitrous acid or nitrite ions generated in aqueous acid, and to give an acceptable reaction rate without the formation of unwanted by-products. It is preferred that the concentration of sulfamic acid used in the reaction be less than 5 percent by weight of the acid present. Unexpectedly, a large excess of nitric acid does not produce a measurable amount of the orthodinitro compound, provided nitrous acid is suppressed.

EXAMPLE 2

A solution consisting of 0.35 g. of N,N-bis(2-chloroethyl)-2-nitro-p-toluidine in 100 g. acetone was sprayed on mites. At the end of five days 74 percent of the mites were killed. In the control solution containing no N,N-bis(2-chloroethyl)-2-nitro-p-toluidine, no mites were killed.

EXAMPLE 3

The 0.35 percent solution of the preceding example was sprayed on Mexican bean beetle larvae, and on bean leaves infested with larvae. It was found that the feeding of the Mexican bean beetle larvae was repelled.

What is claimed is:

1. A process for preparing N,N-bis(2-chloroethyl)-2-nitro-4-alkyl aniline from N,N-bis(2-chloroethyl)-4-alkyl aniline wherein the alkyl group is selected from the group consisting of methyl, ethyl, propyl, and butyl, consisting essentially of the steps of
    a. contacting said N,N-bis(2-chloroethyl)-4-alkyl aniline with a molar excess of from 50 to 1000 percent over the theoretically required amount of concentrated aqueous nitric acid, the concentration of such acid being from 30 to 80 percent aqueous nitric acid at the beginning of the reaction and at least 30 percent aqueous nitric acid near the completion of the reaction, said reaction being carried out in the presence of from 0.001 to 5 percent by weight of the aqueous acid phase of sulphamic acid;
    b. stopping the reaction prior to complete consumption of the N,N-bis(2-chloroethyl)-4-alkyl aniline; and
    c. recovering N,N-bis(2-chloroethyl)-2-mononitro-4-alkyl aniline.

2. A process in accordance with claim 1 wherein the alkyl group is methyl.

* * * * *